May 6, 1958   J. R. McCRORY   2,833,921
AUTOMATIC CONTINUOUS ZERO-SETTING OF A BALANCED DETECTOR
Filed Dec. 30, 1954   2 Sheets-Sheet 1
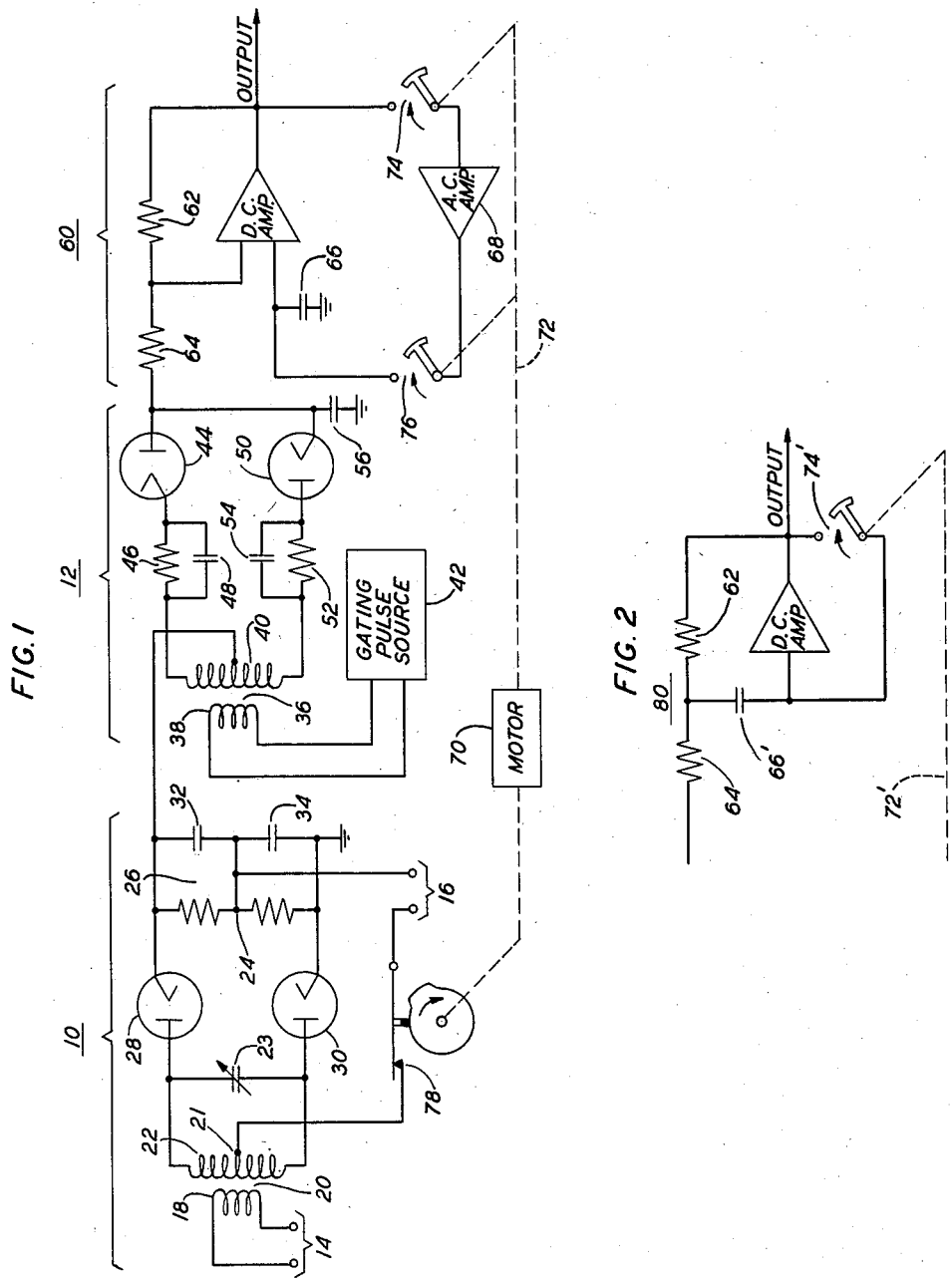
INVENTOR
J. R. McCRORY
BY
ATTORNEY

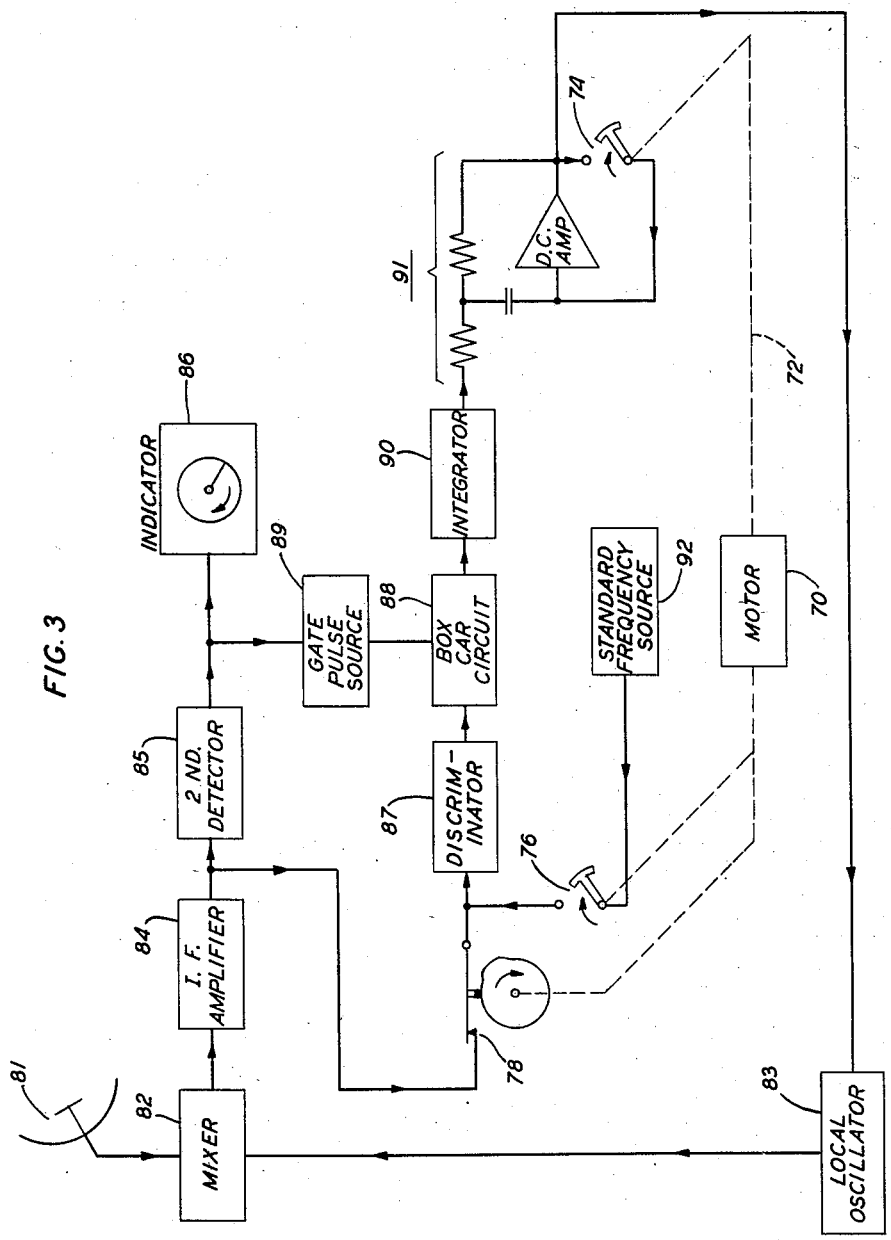

United States Patent Office 2,833,921
Patented May 6, 1958

2,833,921

AUTOMATIC CONTINUOUS ZERO-SETTING OF A BALANCED DETECTOR

James R. McCrory, Mine Hill, N. J., assignor to Bell Telephone Laboratories, Incorporated, New York, N. Y., a corporation of New York Application December 30, 1954, Serial No. 478,808

10 Claims. (Cl. 250—27)

This invention relates to balanced electrical circuits and, more particularly to balanced detectors and automatic means for eliminating effects due to unintended unbalance thereof.

Although it is very important for certain circuits of generally balanced configuration to be in actual accurate electrical balance at all times to avoid distortion of intelligence which passes through them, yet, as is known, much of the time they are not. Thus, in a number of such circuits in which the balanced secondary of an input transformer feeds a load over an initially carefully matched pair of diodes, often by the time that the circuit is needed in some possibly critical operation, the diodes turn out to be no longer matched and the circuit therefore to be no longer balanced.

Two such circuits which are subject to typical operational effects of unbalance are the sine wave phase detector and the "boxcar" pulse stretching coincidence circuit. Each of these particular balanced detectors receives two inputs, a signal input which is modulated to represent changing intelligence values and another input which is unmodulated and merely aids in the detection of the intelligence from the former. In the complete absence of the signal input or when its instantaneous modulation represents a zero intelligence value, neither of these circuits should produce any output at all. In other words, the unmodulated input alone should not cause the circuit to produce any output. To this end, this input, which will hereinafter be designated the "reference signal," is usually fed to the primary of the transformer to be inductively coupled to the secondary and thereby converted into split phases. Accordingly, with the diodes oppositely or similarly poled depending on whether or not there is a common return path from the midpoint of the load impedance to the secondary center tap, rectified components of the split phases will be applied to the opposite sides of the load impedance in opposing and mutually canceling relationship. On the other hand, the intelligence signal is fed in at the center tap of the secondary so that it is not converted into split phases and, depending on its phase relationship to the reference signal, rectification components will be applied to the opposite sides of the load impedance in nonopposing relationship to produce a net signal output, rather than to cancel each other. However, if the diodes have unequal internal resistances, the circuit will be unbalanced and the rectified oppositely phased components of the reference signal will fail to cancel each other out. As a result a spurious positive or negative output of some finite magnitude will be produced when there is no signal input at all or the instantaneous modulation thereof represents zero. In addition, at all other times during such unbalance the instantaneous output produced by the detector will be an inaccurate representation of the information value carried by the signal input by a constant error of the same polarity and magnitude as the above mentioned spurious output. In certain uses of these circuits such inaccurate operation can have very serious effects. Thus in a gun laying radar using gated boxcar circuits for extracting vertical and azimuthal tracking error information from a train of echo pulses, spurious error signals can be generated when there is no error. This will cause the antenna to either track continuously somewhat off target, or where the same kind of a circuit is used in a radar automatic frequency control system, the receiver actually will be continuously tuned to one side of the transmitted carrier instead of precisely on it.

The only way in which this problem was met in the past was by diligent servicing, i. e., by checking and replacing the diodes frequently as well as making occasional routine tests and corrections of the balance of the passive circuit elements. This expedient was unsatisfactory for various reasons: the equipment could not be used operationally while it was being serviced; the manual servicing involved was slow and labor consuming; the need for spare parts was burdensome and expensive; and there was no way of ever knowing for how long the equipment would remain in balance after being serviced.

Accordingly, it is an object of this invention to improve detectors so that at least in effect they are continuously and automatically maintained in exact electrical balance.

In general, this object has been attained by connecting a normally balanced zero-settable type of direct current amplifier between the balanced type circuit or detector in question and the utilization device which is intended to receive its output, and making periodic automatic offsetting changes in the balance or in the quiescent input of the amplifier as needed to compensate for any output errors produced by unbalance of the detector circuit, doing this during output sampling intervals which do not interfere with signal transmission because they are very short and the sampling rate is considerably higher than the fastest variations in the output of the detector, i. e., doing this on a time sharing basis. Thus one type of zero-settable direct current amplifier is deliberately artificially unbalanced so as to deviate from its normal "zero-set" or balanced condition sufficiently and in the correct direction to compensate for any instantaneous output error due to unavoidable unbalance of the detector. As a result, the combination of the detector and the amplifier as a whole will produce a zero output whenever the signal input to the detector is zero or has an instantaneous modulation parameter representing zero. During each periodic automatic adjustment a conidtion of zero signal input to the detector is artificially created and if at that instant there is any (spurious) signal at the output of the amplifier, i. e., any amplified (spurious) detector output, a sample of it is fed back to a control point in the amplifier to compensatingly alter its balance as required. The sample is passed through another amplifier, preferably an alternating current amplifier, since such an amplifier is inherently free of any tendency to drift, if very rapid and precise compensation is desired. Thus if there is any output from the combination during this sampling interval when there should not be, because of the zero signal input, it will be effective to produce the required offset in the balance of the amplifier and therefore to zero-set the combination.

Some of each impulse sent back to the input of the control point of the direct current settable amplifier by the sampling procedure is stored in a condenser so that successively effected changes are cumulative and in a few cycles after the equipment is first turned on, or after any change takes place in the balance of the detector during operation, enough of a total compensating change will have been made to produce the desired zero final output for zero input to the detector.

If there is any quiescent offset in the amplifier itself, i. e., any quiescent unbalance thereof, the dynamic offsetting which takes place in zero-setting the combination will be either greater or less than the offsetting that would be needed for correcting only any prevailing detector unbalance, depending on whether that quiescent offset aids or opposes the detector unbalance. Thus, the automatic adjustment of the amplifier compensates for any drift of its own as well as any unbalance of the detector.

According to one feature of this invention, its use affords a way of economizing in the initial cost of certain equipments. This is possible since any direct current gain incidentally attained after detection by the use of the unbalance compensating amplifier permits a corresponding reduction in the need for more expensive alternating current gain before it. This is particularly important where the alternating current input signal to the detector covers a wide band as it does in the case of the radar echo pulses, since wide band amplification is very much more costly circuitwise than the required direct current amplification, i. e., amplification covering only the band of the output of the detector.

If the operating characteristics of the detector and the direct current amplifier are linear over ranges which exceed the ranges of variation of signals which they must handle by an amount equal to their probable ranges of drift, the combination thus afforded will operate with great accuracy at all times despite such drift and there will be need for only very occasional servicing.

In the drawing:

Fig. 1 is a circuit diagram of an embodiment of the invention in which unbalance of either or both a phase detector and a boxcar pulse stretcher circuit is compensated for by automatic offsetting adjustments in the balance of a zero-settable type of direct current amplifier in which the feedback loop includes an alternating current amplifier;

Fig. 2 is a block diagram of another kind of zero-settable direct current amplifier which does not require an alternating current amplifier in the feedback loop and which can be substituted in the Fig. 1 embodiment for the direct current amplifier shown therein; and Fig. 3 is a block diagram of another embodiment of this invention in which a zero-settable direct current amplifier compensates for unbalance of either or both of two balanced detector circuits employed in a radar automatic frequency control system.

The circuit shown in Fig. 1, by way of example, is of a type used in fire control radars for deriving tracking error information from the echo pulses. To this end it includes a phase detector 10 for converting a train of R. F. echo pulses, which are phase and amplitude modulated in accordance with the direction and magnitude of a tracking error, into video pulses carrying the same information as polarity and amplitude modulations and a boxcar pulse stretching circuit 12 for detecting the modulating components of the video pulses.

The R. F. echo pulses, after heterodyning and I. F. amplification, are fed into a number of separate I. F. output channels (not shown), two of which terminate at respective inputs 14 and 16 of the detector 10. The channel which terminates at the input 14 is effective to derive from the I. F. pulses samples of the unmodulated heterodyned carrier wave comprised therein. These samples are fed over the input 14 into the primary 18 of a transformer 20 to serve as the phase reference input. From the other channel I. F. pulses still carrying the tracking error modulations are fed into the input 16 and thus applied between the center tap 21 of the secondary 22 and the midpoint 24 of an output load impedance 26. A means is provided (also not shown since it is not an essential part of this invention) for establishing at the inputs 14 and 16 such a phase relationship between the reference input and the quiescent signal input, i. e., the signal input in its zero error condition, that they will be in quadrature at the terminals of the secondary 22. Since the establishment and maintenance of this relationship will depend on the relative phase shift produced on the two inputs by the transformer 20, a variable condenser 23 is provided to afford some control of this factor.

The detector 10 is arranged so that when in electrical balance, in addition to producing zero output for zero signal input, as when a tracked target flies out of range, it will also produce zero input when, as during accurate tracking, the carrier of the heterodyned echo pulses and the phase reference input are precisely in the quadrature relationship noted above. To this end a pair of diodes 28, 30 which interconnect respective sides of the secondary 22 and the impedance 26 are similarly poled and each half of the impedance 26 comprises a shunt condenser (32, 34) of an appropriate value to cause the detector to operate as follows:

(1) When there is a reference input but no signal input at all, the upper and lower halves of the detector will respectively rectify alternate halves of each cycle of the carrier of the reference pulses and the condensers 32, 34 will charge up in opposite directions to the peak voltages of these alternate halves. In other words, the I. F. reference pulses will be detected as oppositely going video pulses in the top and bottom halves of the output end of the detector with the result that the output measured across the entire balanced load impedance 26 will be zero providing all of the passive elements of the circuit were properly chosen to establish a balanced configuration when the circuit was assembled and providing the diodes continue to be a matched pair.

(2) Similarly, if only a signal input be fed into the detector 10, regardless of how it might be modulated, equal and opposite video pulses will be produced across the two halves of the load impedance and therefore zero output will again be developed across the entire load provided the circuit is in exact electrical balance. While in this case the operation will be somewhat different in that the same half of each cycle of this R. F. input, rather than respective alternate halves, will be rectified in the upper and lower halves of the load impedance, this will make no difference in the detected, oppositely going video pulses, except that they will be exactly in phase whereas those produced by detecting the reference I. F. pulses alone will be very slightly out of phase by half of a period corresponding to the I. F. frequency.

(3) If both signal and reference inputs are fed into the detector but the former is unmodulated and, therefore, the two inputs are in quadrature phase relationship, the vectorial sums produced by addition of the former with the split phases of the latter will be pairs of resultant I. F. pulses of equal magnitudes which will be converted into equal and opposite, mutually canceling video pulses.

(4) If both signal and reference inputs are fed into the detector and the former is phase modulated, the pairs of resultant I. F. pulses comprising their corresponding vectorial sums will have unequal magnitudes (at all times except when the tracking error may momentarily be zero) and, therefore, will be converted into video pulses which will not cancel each other even though they also are of opposite polarities because they will be unequal. Thus when the detector 10 is exactly balanced, it produces an output only when actual tracking error information is being fed into it.

However, if the diodes should undergo unequal changes over time, e. g., deteriorate unequally, the amounts of voltage drop occurring across them in rectifying equal magnitude I. F. pulses will not be equal and, therefore, neither will the video pulses which are developed across the upper and lower halves of the output impedance. Because of this, when the detector is thus unbalanced electrically, it will produce output video pulses when it should not and will thereby provide the utilization circuits which follow it with false tracking error indications.

Even when the detector 10 is in perfect balance so that its output video pulses accurately indicate needed tracking corrections, their polarity and amplitude respectively indicating the direction in which and the speed at which an antenna drive motor should be run, yet they are not conveniently directly usable for this purpose since their energy content is extremely small because of the low duty cycle of the radar pulses. For this reason a pulse stretching circuit 12 is used to extend the duration of each pulse so that its trailing edge coincides with the leading edge of the next pulse, i. e., to detect the amplitude modulation of the output video pulses. It is noted that, like the phase detector 10, this is another balanced detector circuit which is subject to unintended unbalance. Thus the example of the invention shown in Fig. 1 comprises two such circuits in an apparatus which is adapted to be zero-set as a whole by one zero-settable type of direct current amplifier. This amplifier therefore can utilize feedback from its own output to compensate for errors produced by unbalance of either or both of them, the detector 10 and/or the circuit 12, as well as any unbalance of its own. Moreover, it is to be understood that the number of such serially connected balanced circuits which can be thus zero-set as a group, is not limited to two.

Like the phase detector 10, the boxcar circuit 12 has two inputs which are applied to a balanced, center tapped transformer (36); an unmodulated reference input fed in at the primary (38) to be converted into split phases; and a modulated signal input fed in at the center tap of the secondary (40). In this case the signal input consists of any output video pulses produced by the detector 10 and the reference input is a continuous train of gating pulses provided by a source 42 and occupying the same time channel as the output video pulses. The side of the secondary 40 at which negative gating pulses appear during the operation of the circuit is connected to the cathode of a diode 44 over a resistor 46 having a condenser 48 connected in shunt across it and the side of the secondary at which positive gating pulses appear is connected to the anode of an oppositely poled diode 50 over a resistor 51 having a condenser 54 connected across it in shunt, the anode return of the diode 44 being over the cathode of the diode 50 and the cathode return of the latter diode being over the anode of the former. The resistors 46 and 52 and the condensers 48 and 54 are all high enough in value so that once the condensers have charged up to the peak amplitude of the gating pulses appearing at the terminals of the secondary 40 they can easily retain their charges for the relatively long interval between pulses. As a result the diodes 44 and 50 will be biased below cutoff by charges in the respective networks 46, 48 and 52, 54, i. e., these diode "gates" will be closed. However, since the cutoff biases will be exactly overcome by each subsequent gating pulse for the duration thereof, the gates will be open in the time channel of the signal input video pulses even though they are closed at all other times. It is noted that since the condensers are of a large value of capacitance they afford low impedance bypasses across the resistors thereby covering the series impedances of the upper and lower halves of the circuit 12 for signal transmission. Accordingly, each input video pulse will cause current to flow through one or the other of the diodes depending upon the polarity of the pulse, and, since each such flow of current will be in only one of the two sides of the boxcar circuit, the potential of the point of junction between the output sides of the diodes will move in a positive or negative direction with respect to ground, also depending on the polarity of the input video pulse to an extent dependent on the magnitude of the current flow. This point of juncture is connected to ground over a condenser 56 which is small enough to quickly charge up the peak value of the video pulse thus produced at this point of junction. The gating pulses are of an appropriate duration to cause both diode gates to open before the termination of each input video pulse. Therefore the charge on the condenser 56 will have no circuit over which it can discharge and it will remain at substantially its peak value, depending on the leakage of the condenser, until the next video pulse passes through the circuit at which time it may either be increased, if that pulse is greater in amplitude than the preceding one; decreased if it is smaller, in which case the condenser 56 will discharge back through the input circuit; or even be reversed in polarity or go to zero respectively if the next video pulse is of opposite polarity or of zero amplitude. Thus the boxcar circuit 12 greatly increases the duty cycle of the output of the phase detector 10 and smoothes it out into a step function corresponding to the amplitude modulation component of output video pulses produced thereby. Thus, for example, for a constant tracking error in which the phase detector will produce a train of unidirectional video pulses of a fixed amplitude the output of the boxcar circuit will be a direct potential of constant magnitude. Or, for a tracking error which changes gradually the output of the boxcar circuit will be a step function which, if desired, can very easily be further smoothed out in an integrator circuit or in effect be smoothed out by the integrating action of the inertia of the machinery which is eventually controlled by it.

From the foregoing, it will be apparent that if the phase detector 10 and the boxcar circuit 12 are in perfect electrical balance with only a phase reference input being fed to the former and only gating pulses being fed to the latter the output of the boxcar circuit will be zero volts. It will also be apparent that if either of the two circuits are out of electrical balance this will not be true and that if both of them are unbalanced in aiding directions a fairly substantial spurious signal could be produced which then would appear as a correspondingly substantial inaccuracy in the output of the circuit 12 if and when a signal input is fed into the phase detector. To eliminate such errors the phase detector and boxcar circuit are followed by an automatically zero-settable direct current amplifier 60 utilized in a novel manner to be disclosed below.

The amplifier 60 is of a type in which at least the last amplifying stage is energized by a power supply which is grounded at an intermediate point so that the output point thereof has a quiescent voltage which is close to zero and can be made to be exactly zero by adjusting a parameter of some preceding part of the amplifier circuitry, such as the grid to cathode bias of a preceding amplifying stage. In addition, if desired, the gain of this amplifier may be very precisely stabilized by the use of a known feedback arangement (62, 64) at a value equal to the ratio between the resistances of a feedback resistor 62 and in input resistor 64 thereof.

The unbalance compensating changes of the amplifier 60 are effected over a second feedback circuit which either merely automatically zero-sets the amplifier when the phase detector 10 and boxcar pulse stretcher 12 are in exact balance or compensatingly offsets it when either or both of them are not. The second feedback circuit is from the output of the amplifier 60 to a balance control element thereof (not shown) which would be suitable for zero-setting it in a manner well known in the analog computer art and a condenser 66 is connected between this element and ground. In the embodiment shown herein, the feedback loop includes an alternating current amplifier 68 of suitable gain to make the automatic adjustments as fast and precise as may be desired. The input and output ends of the amplifier 68 are periodically connected into the second feedback circuit for short sampling intervals, for example, at a cyclical rate of fifty times per second for sampling intervals of from five to ten milliseconds. A suitable switching means may comprise a motor 70 driving a three-pole single-throw rotating switch 72 having two pairs of normally open contacts 74 and 76 for periodically connecting the respective input and output sides of the amplifier 68 into the second feedback circuit and a pair of normally closed contacts 78 for periodically opening the signal input circuit of the phase detector 10 at the same time in each sampling cycle, i. e., during the sampling interval. Obviously, when the intelligence signal input circuit of the phase detector 10 is open, there should be no output from the amplifier 60 and there will be none unless either the phase detector 10, the box-car circuit 12, the amplifier 60, or some combination thereof is out of balance. However, if there is any output from the entire series combination at this time when there should not be, a sample of it will be transferred to the amplifier 68 over the closed contacts 74; it will be amplified in this amplifier; and it will be fed into the condenser 66 to change the potential of the balance control element in a direction to reduce the output. At the end of each sampling interval, the charge left on the condenser 66 will not be able to leak off, since its charging circuit will be open and the only other possible discharge path for it will be over the negatively biased grid of the controlled stage. As a result, the gain controlling charge on this condenser will hold over the interval between pulses and at the time of the next sampling it will be augmented if the initial correction was not sufficient to totally eliminate the output. Thus, successive corrections may be cumulative, so that in a few cycles the amplifier 60 will be automatically offset just enough to compensate for any and all unbalance in this combination of three normally balanced circuits and thus produce a condition of zero output from the combination when the signal input into it is zero. Thus, one readily available automatically zero-settable type of direct current amplifier is employed herein to zero set an entire combination of three normally balanced components including two which are not themselves directly automatically zero-settable in any known way.

Fig. 2 shows another type of automatically zero-settable direct current amplifier 80 which may be employed in place of the amplifier 60 for the purposes of the present invention. For certain applications, this type of amplifier may be preferred in that a simpler motor driven switch (72') is required having only one pair of normally open contacts (74'). In this type of direct current amplifier, any output signal should be 180 degrees out of phase with the input signal so that it may be fed directly back to the input to oppose it. In this direct current amplifier, the junction of the feedback resistor 62 and the input resistor 64 is coupled to the grid of the input stage over a condenser 66' in which the output fed back during each sampling interval is stored so that it can oppose the error input which will ready the amplifier 80 from the circuit 12 in the next signal transmission period. The charge will be retained in the condenser during this period because its right side (in the drawing) is connected to an effectively open circuit, i. e., the negatively biased grid of the input stage of the amplifier. Accordingly, as in the case of the amplifier 60, this direct current amplifier is controllable cumulatively and continuously to compensate for an input error.

Fig. 3 shows a radar automatic frequency control system modified in accordance with the present invention. In this system, echo pulses received over an antenna 81 are heterodyned in a mixer 82 with the output of a local oscillator 83 and thereafter amplified in an I. F. amplifier 84; detected in a second detector 85, and displayed as target indications on an indicator 86. In accomplishing frequency control, a small portion of each output intermediate frequency pulse is fed into a discriminator 87 which is tuned precisely to the center of the intermediate frequency band of the receiver so that if the I. F. pulses are displaced with respect to the intended passband the output of the discriminator will be video pulses of a polarity dependent on the direction of the deviation and an amplitude dependent on the magnitude thereof, and if they are exactly centered in the passband, there will be zero output. Because of the low duty cycle of any output video pulses which may be thus produced by the discriminator they are fed to a gated boxcar pulse stretcher 88 like the circuit 12 described in detail above, gating pulses for this circuit being obtained, for example, from a pulse generator 88 which is triggered by the radar timer or in any other of a number of known suitable ways. The output of the boxcar circuit is smoothed out in a low pass filter 90, such as an integrator, and applied to a control element (not shown) of the local oscillator 83 over a direct current amplifier 91, for example, to the reflector of a single cavity klystron, where it can be effective to vary the frequency at which it oscillates. Unfortunately, the automatic frequency control afforded by systems of this kind is often inaccurate because both the discriminator 87 and the boxcar circuit 88, like the circuits 10 and 12 of Fig. 1, are balanced detectors which are subject to getting out of balance and then producing spurious and/or inaccurate outputs. According to the present invention such inaccuracies are overcome by employing as the amplifier 91 one of an automatically zero-settable type and providing means for automatically making compensating changes in its operating condition in some suitable manner similar to those described above with respect to Figs. 1 and 2.

The automatic means employed for this purpose includes a standard frequency source 92 and, as in Fig. 1, a motor 70 driving a rotatable switch 72 having two pairs of normally open contacts 74, 76 and one pair of normally closed contacts 78. The source 92 may be a crystal controlled oscillator comprising enough frequency doublers to produce an output corresponding to the center frequency of the I. F. passband, e. eg., an output of sixty megacycles.

Since the direct current amplifier 91 is of the type shown in Fig. 2, only one (74) of the two pairs of normally open contacts is needed to complete the feedback circuit over which the unbalance compensation is effected. However, the other pair (76) is employed to connect the input of the discriminator 87 to the output of the source 92 when, during each sampling interval, it is disconnected from the I. F. amplifier by actuation of the normally closed contacts 78. If the direct amplifier 91 has an output other than zero when the input to the discriminator 87 is being derived from the standard frequency source 92, it is an indication that either the discriminator 87 or the boxcar circuit 88 or the direct current amplifier 91 itself or some combination thereof is out of balance. However, this amplifier output will be fed back to provide increments of opposing input until its compensating effect will cause the amplifier 91 to have the desired zero output when the discriminator 87 is being fed from the source 92 or, what is equivalent, when it is receiving I. F. pulses of exactly the right frequency. As a result, this automatic frequency control system will not apply a control voltage to the local oscillator 83 to alter its frequency and thereby the tuning of the radar receiver unless such an automatic frequency control correction is actually needed, i. e., unless the output of the mixer 82 is actually not accurately centered in the passband of the I. F. amplifier 84.

What is claimed is:

1. Apparatus comprising a first balanced circuit having a signal input and a signal output and subject to electrical unbalance, said circuit being adapted to receive on said input a signal having its principal components in a predetermined frequency band and carrying modulations representing changing intelligence values including zero and to translate the signal into a voltage on said output having its principal components in a lower frequency band and carrying corresponding modulations representing the same values; a second balanced circuit having a signal input and a signal output and adapted to have its balance changed in response to a control voltage; said output of the first circuit being coupled to said input of the second circuit; means for artificially producing a condition at the signal input of said first circuit to cause the instantaneous modulation of said voltage on said output to represent said zero intelligence value; means for sampling the condition of signal output of the second circuit during said artificial condition to obtain a voltage thereat when said first circuit is unbalanced; and means for applying said voltage to said second circuit to change the electrical balance thereof in a direction to reduce an undesired effect of the unbalance of said first circuit.

2. Apparatus as in claim 1 in which said last mentioned means comprises means for amplifying said voltage before it is applied to said second circuit to change the electrical balance thereof.

3. Apparatus comprising a balanced circuit having a signal input and a signal output and subject to electrical unbalance, said circuit being adapted to receive on said input a signal having its principal components in a predetermined frequency band and carrying modulations representing changing intelligence values including zero and to translate the signal into a voltage on said output having its principal components in a lower frequency band and carrying corresponding modulations representing the same values, and said circuit having a translation characteristic for said first modulations which is substantially linear over a greater frequency range than the wider of said frequency bands; a balanced amplifier having a signal input and a signal output and adapted to have its balance changed in response to a control voltage; said output of the circuit being coupled to said input of the amplifier; means for artificially producing a condition at the signal input of said circuit to cause the instantaneous modulation of said voltage on said output to represent the zero intelligence value; means for sampling the condition of the signal output of said amplifier during said artificial condition to obtain a voltage thereat when said circuit is unbalanced; and means for applying said voltage to said amplifier to change the electrical balance thereof in a direction to reduce an undesired effect of the unbalance of said circuit.

4. Apparatus comprising a balanced phase detector having respective reference and signal inputs and a signal output; a normally balanced amplifier which has respective signal and balance control inputs and a signal output and is adapted to have its balance changed in response to application of a control voltage to said control input; said signal output of the detector being coupled to said signal input of the amplifier; automatic means for periodically producing a predetermined signal input condition at said signal input of the detector; and means for connecting said signal output of the amplifier to said control input thereof each time that said predetermined input condition is produced by said automatic means.

5. Apparatus comprising a balanced gated pulse stretching circuit having respective gating pulse and signal pulse inputs and a signal output; a normally balanced amplifier which has respective signal and balance control inputs and a signal output and is adapted to have its balance changed in response to application of a control voltage to said control input; said signal output of the stretching circuit being coupled to said signal input of the amplifier; automatic means for periodically producing a predetermined signal input condition at said signal input of the stretching circuit; and means for connecting said signal output of the amplifier to said control input thereof each time that said predetermined input condition is produced by said automatic means.

6. Apparatus comprising a balanced frequency modulation discriminator having a signal input and a signal output; a normally balanced amplifier which has respective signal and balance control inputs and a signal output and is adapted to have its balance changed in response to application of a control voltage to said control input; said signal output of the discriminator being coupled to said signal input of the amplifier; automatic means for periodically producing a predetermined signal input condition at said signal input of the discriminator; and means for connecting said signal output of the amplifier to said control input thereof each time that said predetermined input condition is produced by said automatic means.

7. Apparatus comprising a balanced detector having an input for receiving a signal carrying a modulating component having variations which represent information values including zero; said detector also having an output and being adapted to detect said component from said signal at said output; a balanced circuit having a signal input and a signal output and adapted to have its balance changed in response to a control voltage; said output of said detector being coupled to said input of said circuit; means for artificially producing a zero value representing signal input condition at said input of the detector; means for sampling the condition of the signal output of said circuit during said artificial signal input condition to obtain a voltage thereat when said detector is unbalanced; and means for applying said voltage to said circuit to change the electrical balance thereof in a direction to reduce an undesired effect of the unbalance of the detector.

8. Apparatus comprising a balanced detector having an input for receiving a signal carrying a modulating component having a varying parameter whose instantaneous values represent information values including zero; said detector also having an output and being adapted to detect said component from said signal to produce at said output voltages which include zero voltage and represent respective instantaneous values of said parameter, the zero voltage representing the particular instantaneous parameter value which represents the zero information value; said detector being subject to unbalance causing it to produce at said output a voltage other than zero voltage whenever the instantaneous value of said parameter represents the zero information value; a balanced circuit having signal and balance control inputs and a signal output and adapted to have its balance changed in response to application of a control voltage to said control input; said output of the detector being coupled to said signal input of said circuit; means for artificially producing at said input of the detector a signal input condition representing said zero information value; means for sampling the condition of said signal output of said circuit during said artificial signal input condition to obtain a voltage thereat whenever said detector is unbalanced due to the presence at said output of the detector at such times of said voltage other than zero voltage; and means for applying to said balance control input of said circuit at least part of said voltage obtained at its output to change its balance in a direction to reduce said voltage obtained thereat.

9. In combination, balanced circuit means for receiving an alternating current input signal having its principal components in a preassigned frequency band and carrying modulations representing changing intelligence values and for translating the signal into an output voltage having its principal components in a lower frequency band and carrying corresponding modulations representing the same intelligence values, a direct current amplifier connected to the output of said balanced circuit means, storage means including a capacitor connected to the input of said direct current amplifier for supplying a correction voltage to said amplifier, and means for periodically disabling the alternating current input to said balanced circuit means and for simultaneously coupling a signal derived from the output of said direct current amplifier to said storage means for compensating for any unbalance of said balanced circuit and said direct current amplifier.

10. In combination, a balanced circuit having an alternating current signal input circuit and a direct current signal output circuit, a direct current amplifier connected to the output of said balanced circuit, means connected to the input of said direct current amplifier for substantially instantaneously storing a zero correction and for supplying said correction to said amplifier, and means for periodically disabling said alternating current signal input and simultaneously coupling a signal derived from the output of said direct current amplifier to said storage means for compensating for any unbalance of said balanced circuit and said direct current amplifier.

References Cited in the file of this patent

UNITED STATES PATENTS

| | | |
|---|---|---|
| 2,569,135 | Trischka et al. | Sept. 25, 1951 |
| 2,640,157 | Wallman | May 26, 1953 |
| 2,676,253 | Ayres | Apr. 20, 1954 |

OTHER REFERENCES

Bradley et al.: "Driftless D. C. Amplifier," Electronics, for April 1952, vol. 25, No. 4, pp. 144–148.